United States Patent
Satoh et al.

(10) Patent No.: US 7,224,369 B2
(45) Date of Patent: May 29, 2007

(54) IMAGE PROCESSING APPARATUS AND METHOD OF SAME

(75) Inventors: Jin Satoh, Tokyo (JP); Hitoshi Ishikawa, Tokyo (JP)

(73) Assignee: Sony Corporation, Tokyo (JP)

(*) Notice: Subject to any disclaimer, the term of this patent is extended or adjusted under 35 U.S.C. 154(b) by 246 days.

(21) Appl. No.: 11/081,212

(22) Filed: Mar. 16, 2005

(65) Prior Publication Data

US 2005/0156935 A1    Jul. 21, 2005

Related U.S. Application Data

(63) Continuation of application No. 10/318,785, filed on Dec. 13, 2002, now Pat. No. 6,943,802.

(30) Foreign Application Priority Data

Dec. 14, 2001    (JP) ............................. 2001-381808

(51) Int. Cl.
*G06T 15/00*    (2006.01)

(52) U.S. Cl. ...................... 345/565; 345/428; 345/549; 428/549; 428/586

(58) Field of Classification Search ................ 345/565, 345/660, 667, 671; 348/714, 715, 716
See application file for complete search history.

(56) References Cited

U.S. PATENT DOCUMENTS

| | | | |
|---|---|---|---|
| 5,457,779 A | 10/1995 | Harrell | 345/502 |
| 5,671,401 A | 9/1997 | Harrell | 345/505 |
| 5,875,040 A | 2/1999 | Matraszek et al. | 358/447 |
| 6,111,582 A | 8/2000 | Jenkins | 345/421 |
| 6,222,550 B1 | 4/2001 | Rosman et al. | 345/419 |
| 6,377,265 B1 | 4/2002 | Bong | 345/505 |
| 6,667,745 B1 | 12/2003 | Hussain | 345/545 |
| 6,943,802 B2 * | 9/2005 | Satoh et al. | 345/565 |
| 6,992,678 B2 * | 1/2006 | Satoh et al. | 345/565 |
| 2002/0158865 A1 | 10/2002 | Dye et al. | 345/419 |
| 2002/0171672 A1 | 11/2002 | Lavelle et al. | 345/630 |
| 2003/0034981 A1 | 2/2003 | Wada | 345/581 |

* cited by examiner

*Primary Examiner*—Phu K. Nguyen
(74) *Attorney, Agent, or Firm*—Frommer Lawrence & Haug LLP; William S. Frommer (57) ABSTRACT

An image processing apparatus, able to improve the pixel fill rate and able to prevent an increase of memory resources and increase of memory access, provided with a color calculation circuit for performing pixel level processing based on supplied first attribute parameters of the Z and color (R, G, B) data and outputting second attribute parameters and (x, y) coordinate data supplied by a DDA circuit together with the results and a sub primitive generation circuit for expanding a plurality of stamps to a plurality of sub primitives (sub stamps) based on the second attribute parameters of the color calculation circuit, generating expanded coordinates corresponding to the expanded sub stamps based on the (x, y) coordinate data of the DDA circuit, and outputting the same as the drawing parameters after expansion and the expanded graphics drawing coordinates to a memory controller, and a method of the same.

2 Claims, 7 Drawing Sheets

IMAGE PROCESSING APPARATUS AND METHOD OF SAME

This is a continuation of application Ser. No. 10/318,785 filed Dec. 13, 2002, now U.S. Pat. No. 6,943,802, the entirety of which is incorporated herein by reference.

BACKGROUND OF THE INVENTION

1. Field of the Invention

The present invention relates to an image processing apparatus for calculating the colors of pixels and writing values thereof into a memory and a method of the same.

2. Description of the Related Art

In the past, in the field of three-dimensional computer graphics, the general practice has been to express and draw an object by surfaces.

Contrary to this, in recent years, the technique of "point rendering" which regards an object as a collection of points and draws points z-sorted in advance as semi-transparent circles having certain sizes on a screen has been proposed.

When points are located sufficiently close to each other, it is possible to use this point rendering to generate graphics without gaps.

This technique can be used also for generation of general opaque surface objects as well, but it particularly suitable for expressing soft objects having semi-transparent elements such as a gas or fur.

When trying to express this by conventional hardware, a high pixel fill rate including semi-transparent processing becomes necessary.

In general, however, an image processing system equipped with an external frame memory is restricted in the number of pixels which it can read from or write into the frame memory due to the constraint of the memory band width. Therefore, it is difficult to raise the pixel fill rate.

Even when using an internal frame memory, it is difficult to increase the number of digital differential analyzer (DDA) or setup/drawing circuits due to the constraint of the chip area. Therefore, the number of generated pixels is restricted due to the constraint of the amount of pixel processing and it is difficult to raise the pixel fill rate.

Furthermore, when expressing an object having semi-transparent elements such as fur by conventional hardware, it may be considered to write the radii of the circles along with color information into the memory and use these for filtering.

When using the technique of holding color information and the radii of circles in the memory and using these for filtering, however, it becomes difficult to express circles not fitting the grid.

By managing the memory by units smaller than pixels, circles not fitting the grid can be expressed, but the size of the required memory would end up increasing along with this.

Also, generally, filtering is suitable when processing the entire screen. For this reason, there are cases where pixels inherently not requiring filtering will be processed, so wasteful memory access will occur.

SUMMARY OF THE INVENTION

A first object of the present invention is to provide an image processing apparatus able to improve the pixel fill rate without increasing the number of the DDA or setup/color calculation circuits and able to realize the large pixel fill rate required for drawing a gas, fur, or the like and a method of the same.

A second object of the present invention is to provide an image processing apparatus able to prevent an increase of the required memory resources and able to prevent an increase of memory access when realizing point rendering using filtering and a method of the same.

To attain the above objects, according to a first aspect of the present invention, there is provided an image processing apparatus comprising a memory module in which image data is drawn; a processing circuit for generating pixel data based on primitive parameters and outputting the pixel data and address data and first attribute parameters of the pixels; a color calculation circuit for calculating color based on the first attribute parameters of the processing circuit and outputting second attribute parameters of the pixels after the color calculation; a pixel increasing circuit for generating a plurality of the pixels based on the second attribute parameters of the color calculation circuit and generating addresses of the plurality of pixels based on the address data of the processing circuit; and a memory controller for drawing a plurality of pixels generated by the pixel increasing circuit in the memory module.

According to a second aspect of the present invention, there is provided image processing apparatus comprising a memory module in which image data is drawn; a processing circuit for generating pixel stamps based on primitive parameters and outputting the stamp data and address data and first attribute parameters of the stamps; a color calculation circuit for calculating color based on the first attribute parameters of the processing circuit and outputting second attribute parameters of the pixels after the dolor calculation; a sub primitive generation circuit for expanding the plurality of stamps to a plurality of sub primitives based on the second attribute parameters of the color calculation circuit and the address data of the processing circuit; and a memory controller for drawing the sub primitives generated by the sub primitive generation circuit in the memory module.

In the first and second aspects, preferably the pixel increasing circuit or the sub primitive generation circuit includes a generation parameter generation unit for generating parameters of nearby pixels based on the second attribute parameters.

In the first and second aspects, alternatively the address data generated by the processing circuit is two-dimensional coordinate data of the pixels, and the pixel increasing circuit or the sub primitive generation circuit includes an expanded coordinate generation unit for generating the two-dimensional coordinate data of the nearby pixels based on the two-dimensional coordinate data of the processing circuit.

In the first and second aspects, alternatively the address data generated by the processing circuit is two-dimensional coordinate data of the pixels, and the pixel increasing circuit or the sub primitive generation circuit includes a drawing parameter generation unit for generating parameters of nearby pixels based on the second attribute parameters and an expanded coordinate generation unit for generating the two-dimensional coordinate data of nearby pixels based on the two-dimensional coordinate data of the processing circuit.

In the first and second aspects, alternatively the pixel increasing circuit or the sub primitive generation circuit generates pixels of specific shapes.

In the first and second aspects, alternatively the pixel increasing circuit or the sub primitive generation circuit determines a region of increase of pixels based on the second attribute parameters.

In the first and second aspects, alternatively the second attribute parameters are vectors on a window screen.

In the first and second aspects, alternatively the second attribute parameters have the size of a region on the window screen.

In the first and second aspects, alternatively the second attribute parameters are sums of degrees of opaqueness in the region.

In the first and second aspects, alternatively the pixel increasing circuit or the sub primitive generation circuit changes the degree of opaqueness according to the area of the region in which pixels are increased.

In the first and second aspects, alternatively the pixel increasing circuit or the sub primitive generation circuit assigns the same color to the region in which the pixels are increased.

In the first and second aspects, alternatively the primitive being drawn is a gaseous object.

In the first and second aspects, alternatively the primitive being drawn is, a furry object.

According to a third aspect of the present invention, there is provided an image processing method comprised of a first step of generating pixel data based on primitive parameters and outputting the pixel data and address data and first attribute parameters of the pixels; a second step of calculating color based on the first attribute parameters and generating second attribute parameters of the pixels after the color calculation; a third step of generating a plurality of pixels based on the second attribute parameters and generating addresses of the plurality of pixels based on the address data; and a fourth step of drawing the generated plurality of pixels in the memory module.

According to a fourth aspect of the present invention, there is provided an image processing method comprised of a first step of generating pixel stamps based on primitive parameters and outputting the stamp data and address data and first attribute parameters of the stamps; a second step of calculating color based on the first attribute parameters and generating second attribute parameters of the pixels after the color calculation; a third step of expanding a plurality of the stamps to a plurality of sub primitives based on the second attribute parameters and the address data; and a fourth step of drawing the generated sub primitives in the memory module.

In short, according to the present invention, for example the processing circuit generates the pixel data based on the primitive parameters and outputs the pixel data and the address data and the first attribute parameters of the pixels to the color calculation circuit.

The color calculation circuit calculates color based on the first attribute parameters of the processing circuit and outputs the second attribute parameters of pixels after the color calculation to the pixel increasing circuit.

The pixel increasing circuit generates a plurality of pixels based on the second attribute parameters of the color calculation circuit. Also, the pixel increasing circuit generates addresses of the plurality of pixels based on the address data of the processing circuit.

Then, the memory controller draws the plurality of pixels generated by the pixel increasing circuit in the memory module.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Figure 1:
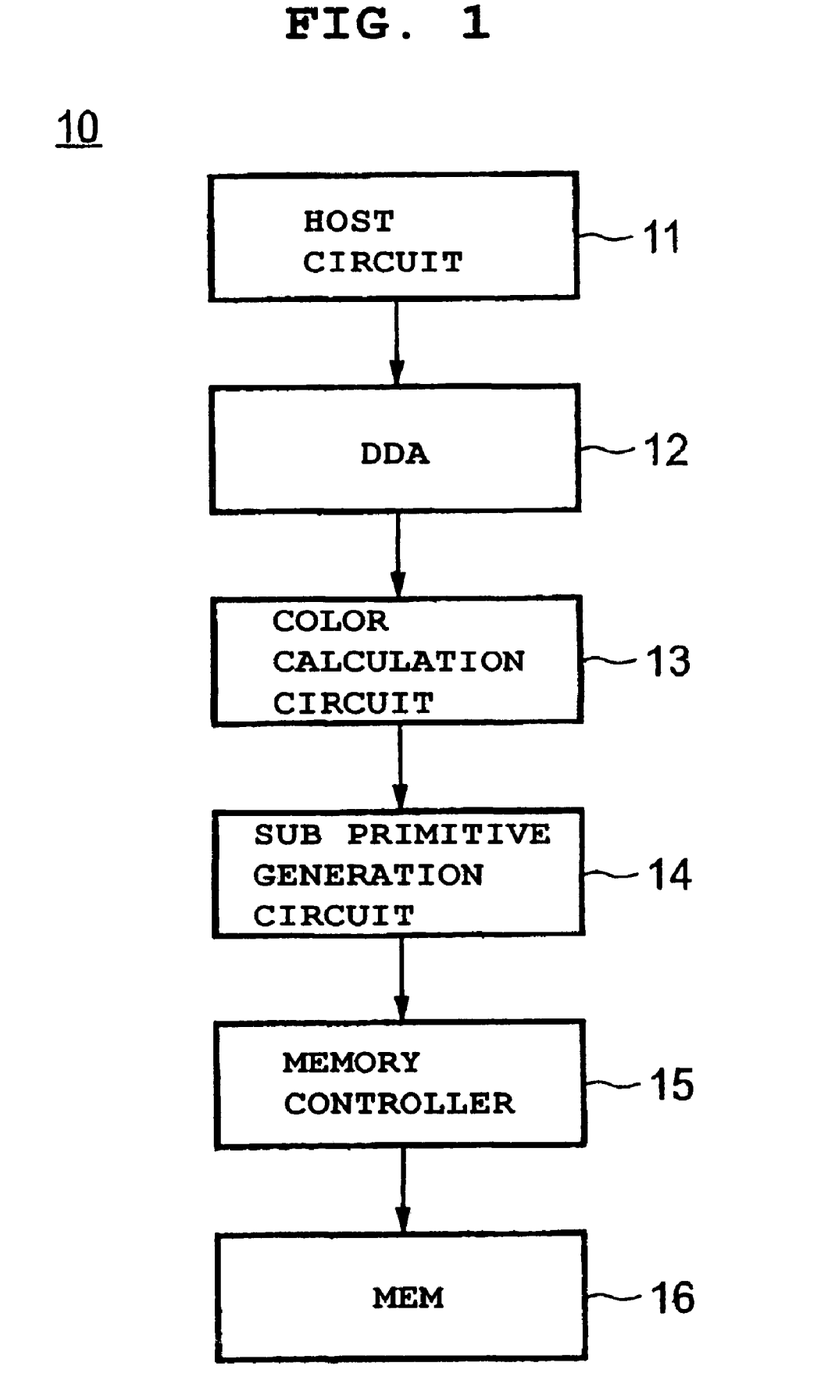
FIG. 1 is a block diagram of the configuration of an image processing apparatus according to a first embodiment of the present invention.
Figure 2:
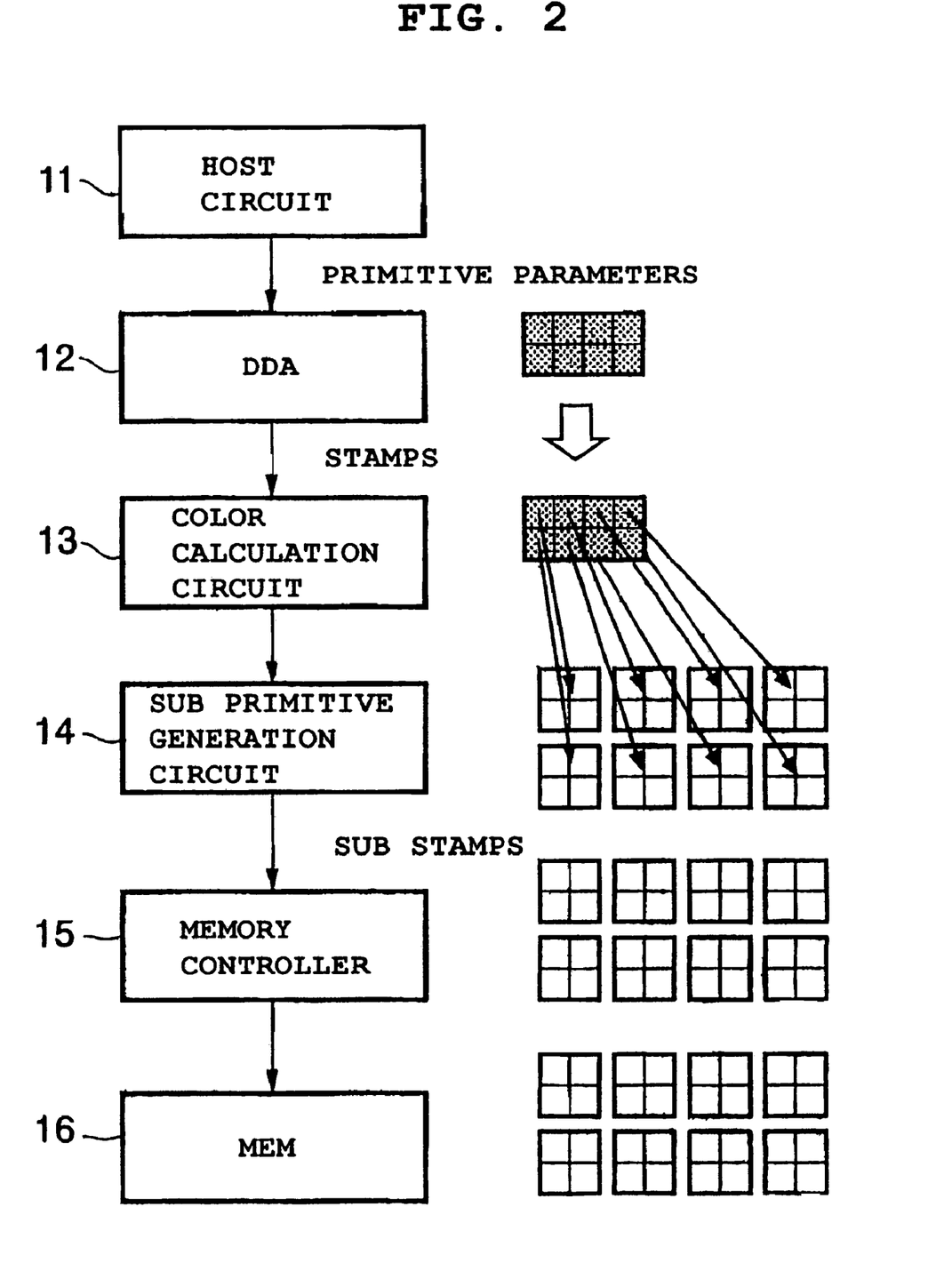
FIG. 2 is a view of a processing flow linked with the architecture of FIG. 1 in an image processing apparatus according to the present embodiment.

FIG. 1 is a block diagram of the configuration of an image-processing apparatus according to a first embodiment of the present invention. FIG. 2 is a view of the flow of processing flow linked with the architecture of FIG. 1 in the image processing apparatus according to the present embodiment.

The image processing apparatus 10 has, as shown in FIG. 1, a host circuit 11 serving as a processing circuit, a DDA circuit 12 as a processing circuit, a color calculation circuit 13, a sub primitive generation circuit 14 corresponding to a pixel increasing circuit, a memory controller 15, and a memory module (MEM) 16 comprised by for example a dynamic random access memory (DRAM).

The host circuit 11 controls transfer of data with a central processing unit (CPU) or an external memory, performs operations on the vertex data, sets up a primitive, and outputs primitive parameters to the DDA circuit 12.

Specifically, the host circuit 11 performs a Per-Vertex operation when data is input.

In this processing, when receiving as input vertex data such as three-dimensional coordinates and normal vectors, the circuit performs various operations on the vertex data. As typical operations, there are processing for coordinate conversion for deforming an object, projecting it onto a screen, and so on, processing for lighting, processing for clipping, etc.

The DDA circuit 12 calculates DDA parameters based on the information from the host circuit 11.

In this processing, the DDA circuit 12 calculates DDA parameters such as inclinations of various data (Z, R, G, B, etc.) required for rasterization.

Also, the DDA circuit 12 performs the rasterization based on the parameter data.

Specifically, it rasterizes various data (Z, color (R, G, B), etc.)

The DDA circuit 12 outputs two-dimensional coordinates (x, y) data-as address data of the pixels and (Z, color (R, G, B), etc.) at these (x, y) coordinates as the first attribute parameters to the color calculation circuit 13.

In this case, the DDA circuit 12 generates and outputs 8 (2×4) pixels worth of the pixel stamp data to be processed to the color calculation circuit 13.

The color calculation circuit 13 performs pixel level processing (per-pixel operations) based on the first attribute parameters of the Z and color (R, G, B) data supplied by the DDA circuit 12 and outputs second attribute parameters and the (x, y) coordinate data supplied by the DDA circuit 12 to the sub primitive generation circuit 14 along with the results.

In this pixel level processing, the various types of data after rasterization are processed in pixel units. The processing performed here corresponds to a so-called "Pixel Shader" such as lighting at the pixel level (per-pixel lighting).

The second attribute parameters given to the sub primitive generation circuit 14 by the color calculation circuit 13 include the color, degree of transparency, size, density, etc. of the pixels.

The sub primitive generation circuit 14 expands a plurality of stamps to a plurality of sub-primitives (sub stamps) based on the second attribute parameters of the color calculation circuit 13, generates expanded coordinates corresponding to the expanded sub stamps based on the (x, y) coordinate data of the DDA circuit 12, and outputs the same as the drawing parameters after expansion and expanded drawing coordinates to the memory controller 15.

Figure 3:
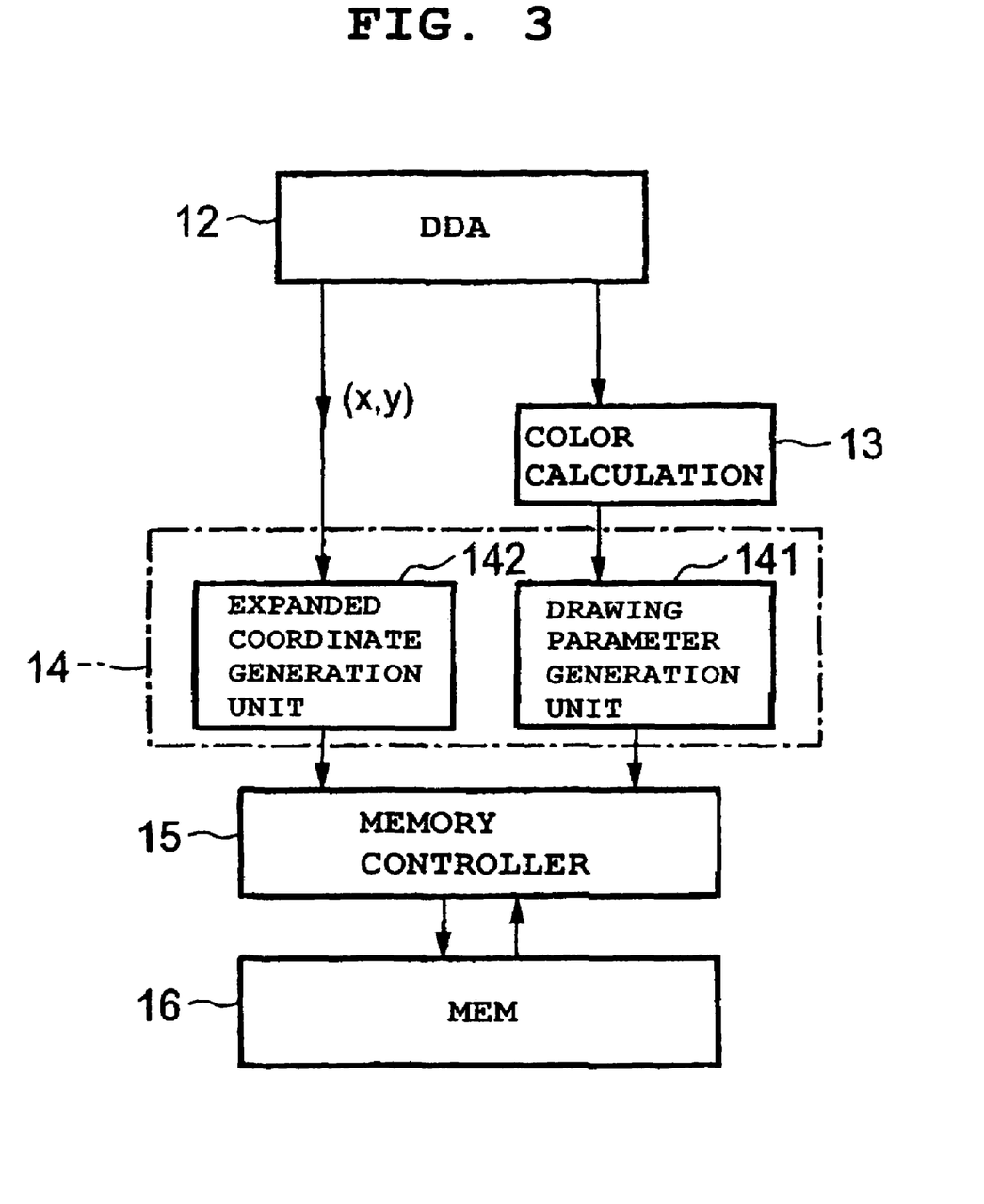
FIG. 3 is a view for explaining the fundamental configuration of a sub primitive generation circuit according to the present embodiment.

FIG. 3 is a view for explaining the fundamental configuration of the sub primitive generation circuit 14.

This sub primitive generation circuit 14 has, as shown in FIG. 3, a drawing parameter generation unit 141 for generating drawing parameters of nearby pixels of an original pixel based on the second attribute parameters and an expanded coordinate generation unit 142 for generating the two-dimensional coordinate data of nearby pixels, that is, the expanded coordinates, based on the (x, y) coordinate data of the DDA circuit 12.

The drawing parameter generation unit 141 expands for example the color of each pixel of the stamp as it is.

The expanded coordinate generation unit 142 generates a plurality of (x, y) coordinates of sub stamps from the (x, y) coordinates of the stamps.

Note that, here, the sub primitives to be generated have fixed shapes and sizes. For this reason, it is not necessary to separately have functions such as setup/DDA, so the circuit can be relatively cheaply realized. In the circuit explained above, however, the region in which the pixels are expanded cannot be arbitrarily changed.

Below, a description will be given of processing of a more general expanded coordinate generation unit and drawing parameter generation unit.

Below, the sequence of processing of the expanded coordinate generation unit will be described.

When sizes (w, h) of a rectangular region are given from a host controller (DDA circuit in the present embodiment), a pixel included in the range of the corresponding rectangular region is selected, and x, y coordinates in this window are listed.

```
k = 0
for(j=-h/2; j ≦ h/2; j++){
    for(i = -w/2; i ≦ w/2; i++){
        x[k] = (int)x + i
        y[k] = (int)y + j
        k++
    }
}                                                    (1)
```

According to equation (1), the corresponding pixel can be increased to a plurality of pixels. Further, there also exists a case where one region is defined by a certain table. A case where this table is tb1[index][w][h] and an index to the table is given from the host controller will be considered. Here, w and h are the sizes of the width/height of a kernal. It is assumed that 1 is stored in tbl when it is valid, and 0 is stored in tbl when it is invalid.

```
k = 0
for(j = 0-; j < h; j++){
    for(i = 0; i < w; i++){
        if(tbl[index][i][j]){
            x[k] = (int)x + i - w/2
            y[k] = (int)y + j - h/2
            k++
        }
    }
}                                                    (2)
```

By utilizing a general table in this way, it becomes possible to expand a pixel to a region of various shapes.

Next, the processing of the drawing parameter generation unit will be explained.

As parameters, for example the color and the degree of transparency of the pixels are given in many cases. Here, as the color of a pixel, as shown in the next equation, the same color given from the host controller will be utilized as it is.

$$c[k]=c \qquad (3)$$

In general, the transparency degree a is changed in accordance with the area of the region. For example, when a pixel is increased to the rectangular region of w×h as in the above equation (1), it is changed as follows;

$$a[k]=a/(w*h) \qquad (4)$$

On the other hand, when using the general table as in equation (2) mentioned above, the area of the region is known in advance for every index. Therefore, when defining a reciprocal of this as one-over-area [ ], it can be calculated as follows.

$$a[k]=a*\text{one-over-area}[index] \qquad (5)$$

Next, an example of the configuration of the sub primitive generation circuit and the operation thereof when the object drawn is a gaseous object will be explained.

Figure 4:
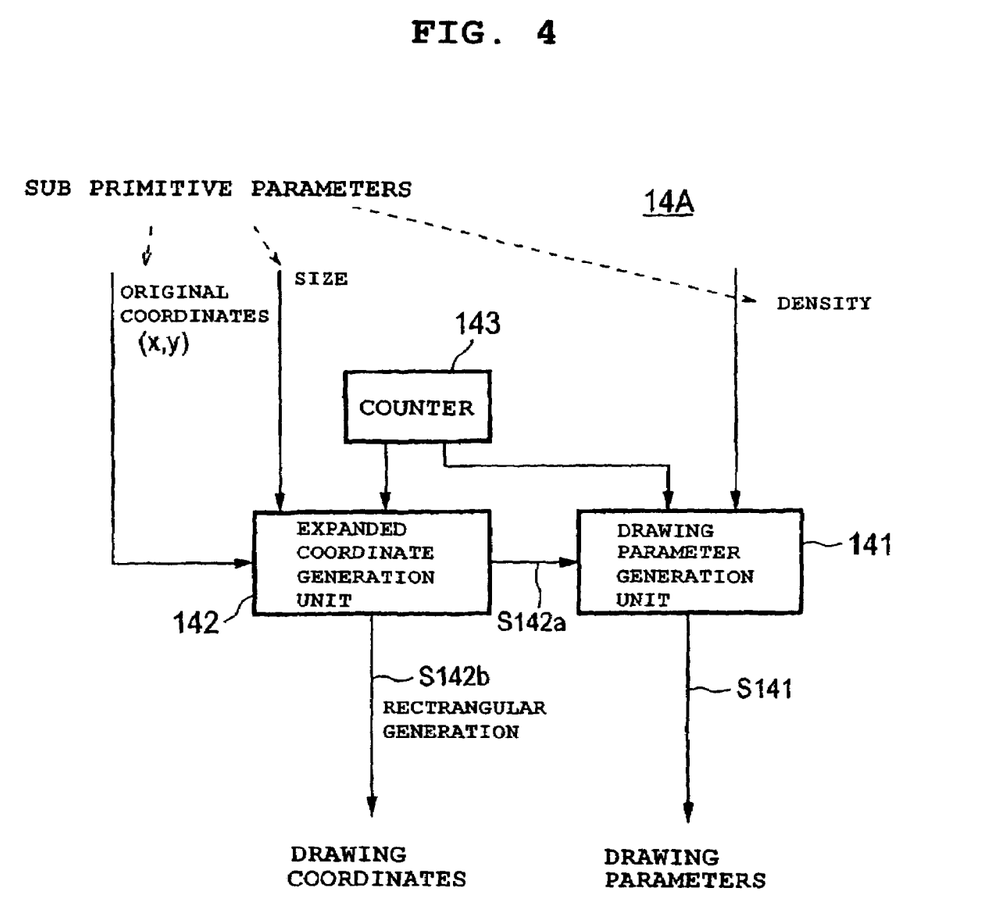
FIG. 4 is a block diagram of an example of the configuration of the sub primitive generation circuit when the object drawn is a gaseous object.
Figure 5:
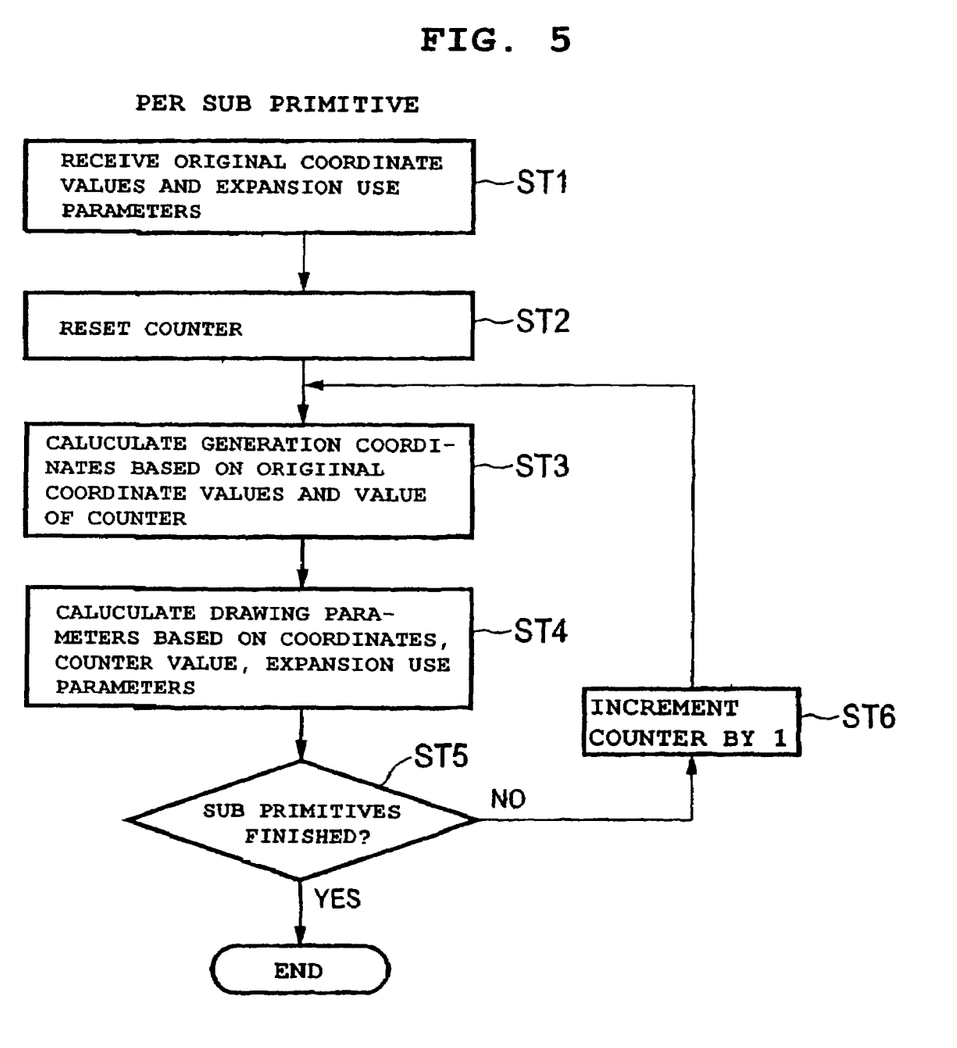
FIG. 5 is a flow chart for explaining an operation of the circuit of FIG. 4.

FIG. 4 is a block diagram of an example of the configuration of the sub primitive generation circuit when the object drawn is a gaseous object, while FIG. 5 is a flow chart for explaining the operation of the circuit of FIG. 4.

A sub primitive generation circuit 14A of FIG. 4 has a counter 143 in addition to the drawing parameter generation unit 141 and the expanded coordinate generation unit 142.

In this case, the density data is given to the drawing parameter generation unit 141 as a second attribute parameter (expansion use parameter), while the original coordinates (x, y) and the parameter of the size are given to the expanded coordinate generation unit 142.

The drawing parameter generation unit 141 calculates a relative density based on the relative location in the sub primitive and multiplies it by the whole density to find the degree of opaqueness.

The sub primitive generation circuit 14A receives the original coordinate value and the expansion use parameter (ST1) and resets the counter 143 (ST2).

Then, the expanded coordinate generation unit 142 calculates the drawing coordinates based on the original coordinate value and the count of the counter 143 (ST3) and outputs the drawing coordinates as signals S142a and S142b to the drawing parameter generation unit 141 and the memory controller 15.

Next, the drawing parameter generation unit 141 uses the generation coordinates, the count of the counter 143, and the expansion use parameter to calculate the drawing parameters (ST4) and outputs them as the signal S141 to the memory controller 15.

The above operation is carried out while incrementing the counter 143 by +1 at a time until finishing with all sub primitives (ST5, ST6).

The memory controller 15 performs alpha tests, scissoring, Z-buffer tests, stencil tests, alpha blending, and other processing on the expanded sub stamp data supplied from the sub primitive generation circuit 14 and draws the expanded sub pixel data passing the various tests in the memory module 16 based on the expanded coordinates.

The memory controller 15 performs a so-called modified write operation consisting of reading data from a predetermined address and performing writing when required when generating graphics in the memory module 16.

Next, the operation by the above configuration will be explained.

First, in the host circuit 11, operations on the vertex data are performed, one primitive is set up, and the primitive parameters are output to the DDA circuit 12.

In the DDA circuit 12, the DDA parameters, concretely DDA parameters such as inclinations of various types of data (Z, R, G, B, etc.) required for the rasterization are calculated, based on the information of the host circuit 11 and rasterization is performed based on the parameter data.

Then, in the DDA circuit 12, the two-dimensional coordinate (x, y) data as the address data of each pixel and the Z, color (R, G, B), etc. at these (x, y) coordinates is output as the first attribute parameters to the color calculation circuit 13.

In this case, the DDA circuit 12 generates 8 (2×4) pixels worth of the corresponding pixel stamp data to be processed and outputs it to the color calculation circuit 13.

In the color calculation circuit 13, the pixel level processing is performed based on the first attribute parameters of the Z and color (R, G, B) data supplied from the DDA circuit 12 and the second attribute parameters and the (x, y) coordinate data supplied by the DDA circuit 12 are output to the sub primitive generation circuit 14 together with the results.

In the sub primitive generation circuit 14, a plurality of stamps are expanded to a plurality of sub primitives (sub stamps) based on the second attribute parameters of the color calculation circuit 13, the drawing parameters are generated, and these are output to the memory controller 15.

Also, in the sub-primitive generation circuit 14, expanded coordinates corresponding to the expanded sub stamps based on the (x, y) coordinate data of the DDA circuit 12 are generated and these are output to the memory controller 15.

Then, in the memory controller 15, alpha tests, scissoring, Z-buffer tests, stencil tests, alpha blending, and other processing are performed on the expanded sub stamp data supplied from the sub primitive generation circuit 14 and the expanded sub pixel data passing the various tests in the memory module 16 are drawn based on the expanded coordinates.

As explained above, according to the present embodiment, since provision is made of the color calculation circuit 13 for performing the pixel level processing (per-pixel operations) based on the first attribute parameters of the Z and color (R, G, B) data supplied by the DDA circuit 12 and outputting the second attribute parameters and (x, y) coordinate data supplied from the DDA circuit 12 together with the results and the sub primitive generation circuit 14 for expanding a plurality of stamps to a plurality of sub primitives (sub stamps) based on the second attribute parameters of the color calculation circuit 13, generating expanded coordinates corresponding to the expanded sub stamps based on the (x, y) coordinate data of the DDA circuit 12, and outputting the same as the drawing parameters after expansion and the expanded drawing coordinates to the memory controller 15, there are the advantages that the pixel fill rate can be improved without increasing the number of the DDA or setup/color calculation circuits and that a large pixel fill rate required for drawing a gas, fur, etc. can be realized.

When performing point rendering, the increase of the memory resources and the increase of the memory access required when realizing the point rendering by using filtering can be prevented.

The present embodiment is effective also in place of general filtering in addition to point rendering. As mentioned above, filtering requires that even originally unnecessary pixels be read out, so wasteful memory access occurs. By employing the present embodiment in place of the filtering, more efficient memory access is realized and higher speed graphics drawing becomes possible.

When the object drawn is fur, the kernal to be filtered was changed from the vector value in the window coordinate system. By replacing this kernal by the table as mentioned above and expressing the index by a value indicating the direction of the vector of the window coordinate system, it becomes possible to realize the filtering.

At this time, the pixels must be z-sorted in advance, but when for example drawing a shell, the drawing sequence is sorted in the depth direction in most cases, so no problem will occur.

According to the present embodiment, the large pixel fill rate required for drawing a gaseous object etc. can be realized.

Figure 6A:
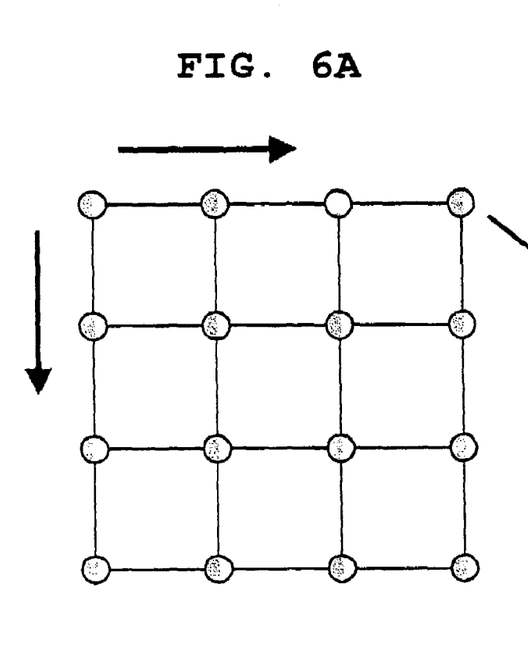
FIGS. 6A to 6C are views of an example of processing when the object drawn is a gaseous object.
Figure 6B:
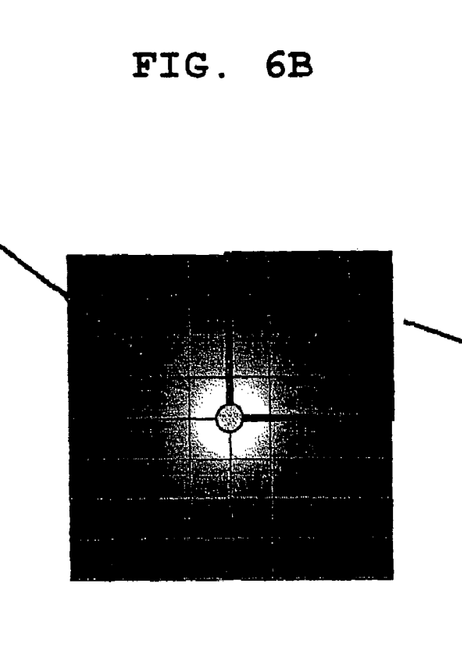
Figure 6C:
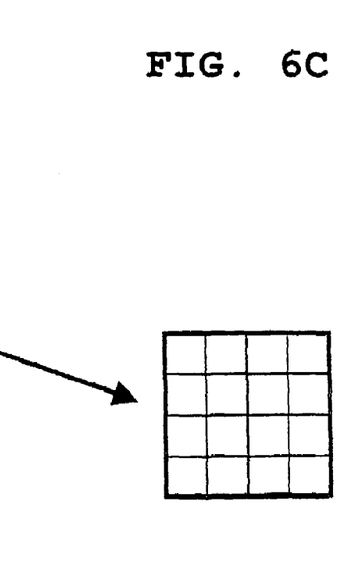

FIGS. 6A to 6C are views of an example of the processing where the object drawn is a gaseous object.

In this case, as shown in FIG. 6A, the DDA circuit 12 generates a grid. As shown in FIG. 6B, the sub primitive generation circuit 14 generates spherical α-values for the vertexes thereof. Next, as shown in FIG. 6C, the memory controller 15 performs pixel operations on them and writes the results in the memory.

Second Embodiment

Figure 7:
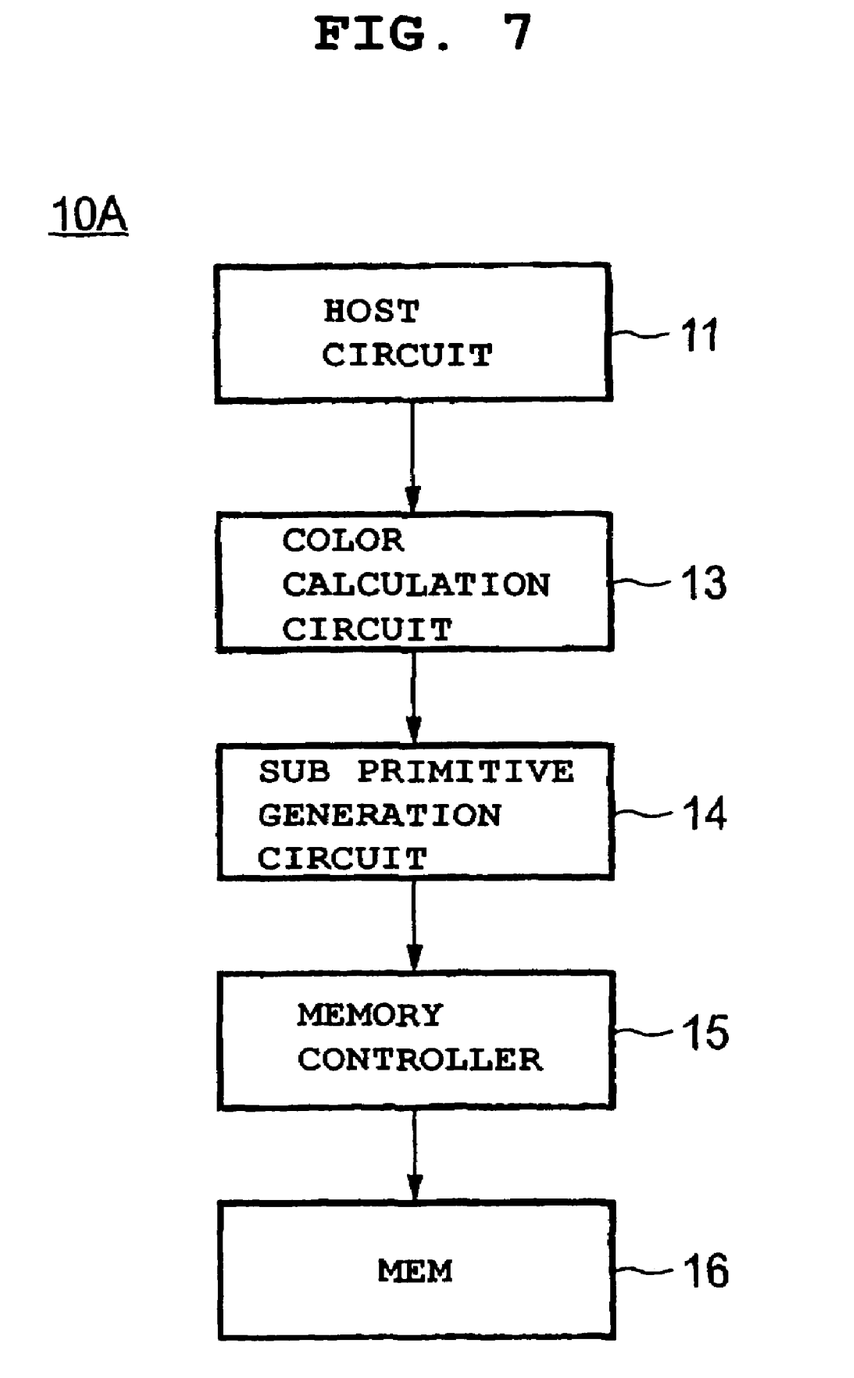
FIG. 7 is a block diagram of the configuration of an image processing apparatus according to a second embodiment of the present invention.

FIG. 7 is a block diagram of the configuration of an image processing apparatus according to a second embodiment of the present invention.

The difference of the second embodiment from the first embodiment is that the DDA circuit is deleted.

When performing the processing as shown in FIGS. 6A to 6C, DDA processing is required, but DDA processing is not always required depending on the processing. FIG. 7 has the configuration corresponding to this.

The rest of the configuration is similar to the first embodiment explained above. There are the advantages that not only are effects similar to those by the first embodiment obtained, but also the apparatus can be simplified.

Note that, in the above embodiments, the explanation was made of the case where the second attribute parameters generated by the color calculation circuit were supplied to the sub primitive circuit, but it is also possible to configure the apparatus so as to directly supply the second attribute parameters of the DDA circuit or make then second attribute parameters pass through the color calculation circuit as they are and then give them to the sub primitive circuit.

Summarizing the effects of the invention, as explained above, according to the present invention, there are the advantages that the pixel fill rate can be improved without increasing the number of the DDA or setup/color calculation circuits and that the large pixel fill rate required for drawing a gas, fur, etc. can be realized.

When performing point rendering, the increase of the memory resources and the increase of the memory access required when realizing it by using the filtering can be prevented.

The present invention is effective also in place of general filtering in addition to point rendering. As mentioned above, filtering requires that even originally unnecessary pixels be read out, so wasteful memory access occurs. By employing the present invention in place of the filtering, more efficient memory access is realized and higher speed graphics generation becomes possible.

When the object drawn is fur, the kernal to be filtered was changed from the vector value in the window coordinate system. By replacing this kernal by the table as mentioned above and expressing the index by a value indicating the direction of the vector of the window coordinate system, it becomes possible to realize the filtering.

At this time, the pixels must be z-sorted in advance, but when for example drawing a shell, the drawing sequence is sorted in the depth direction in most cases, so no problem will occur.

According to the present invention, the large pixel fill rate required for drawing a gaseous object etc. can be realized.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus comprising:
a memory module in which image data is drawn;
a processing circuit for generating pixel data based on primitive parameters and address data which is two-dimensional coordinate data of the pixels, said processing circuit outputting the pixel data and address data and first attribute parameters of the pixels;
a color calculation circuit for calculating color based on the first attribute parameters of the processing circuit and outputting second attribute parameters of the pixels after the color calculation;
a pixel increasing circuit for generating a plurality of the pixels based on the second attribute parameters of the color calculation circuit and generating addresses of the plurality of pixels based on the address data of the processing circuit, the pixel increasing circuit including a drawing parameter generation unit for generating parameters of nearby pixels based on the second attribute parameters and an expanded coordinate generation unit for generating the two-dimensional coordinate data of the nearby pixels based on the two-dimensional coordinate data of the processing circuit; and
a memory controller for drawing a plurality of pixels generated by the pixel increasing circuit in the memory module,
wherein the primitive being drawn is a gaseous object.

2. An image processing method comprising:
a first step of generating pixel data based on primitive parameters and address data, said address data being two-dimensional coordinate data of the pixels, and outputting the pixel data and address data and first attribute parameters of the pixels;
a second step of calculating color based on the first attribute parameters and generating second attribute parameters of the pixels after the color calculation;
a third step of generating a plurality of pixels based on the second attribute parameters, generating addresses of the plurality of pixels based on the address data, and generating parameters of nearby pixels based on the second attribute parameting, generating the two-dimensional coordinate data of nearby pixels based on the two-dimensional coordinate data and generating pixels of specific shapes; and
a fourth step of drawing the generated plurality of pixels in a memory module,
wherein the pixels being drawn comprise a gaseous object.

* * * * *